(12) United States Patent
Nagasaki et al.

(10) Patent No.: US 7,151,862 B2
(45) Date of Patent: Dec. 19, 2006

(54) IMAGE PROCESSING APPARATUS AND METHOD, STORAGE MEDIUM, AND PROGRAM

(75) Inventors: Tanio Nagasaki, Tokyo (JP); Hideaki Tomikawa, Tokyo (JP); Seigo Iwasaki, Tokyo (JP); Tetsuo Motomura, Tokyo (JP); Masahiro Igarashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 771 days.

(21) Appl. No.: 10/299,297

(22) Filed: Nov. 19, 2002

(65) Prior Publication Data

US 2003/0117399 A1   Jun. 26, 2003

(30) Foreign Application Priority Data

Nov. 21, 2001  (JP) .............................. 2001-355866

(51) Int. Cl.
*G06K 9/32* (2006.01)
*G06K 9/36* (2006.01)

(52) U.S. Cl. ..................................... 382/298

(58) Field of Classification Search ............... 382/298, 382/299, 284; 345/428, 419, 569, 582, 552, 345/587; 358/448, 1.2; 703/2
See application file for complete search history.

(56) References Cited

U.S. PATENT DOCUMENTS

| | | | | |
|---|---|---|---|---|
| 5,436,733 A | * | 7/1995 | Terada et al. | 358/448 |
| 5,767,858 A | * | 6/1998 | Kawase et al. | 345/552 |
| 6,034,786 A | * | 3/2000 | Kwon | 358/1.2 |
| 6,476,818 B1 | * | 11/2002 | Ito | 345/569 |
| 6,693,634 B1 | * | 2/2004 | Mitsushita | 345/428 |
| 6,744,440 B1 | * | 6/2004 | Nakamura | 345/582 |
| 6,988,059 B1 | * | 1/2006 | Hasegawa et al. | 703/2 |
| 6,992,664 B1 | * | 1/2006 | Ohmori | 345/419 |

\* cited by examiner

*Primary Examiner*—Amir Alavi
(74) *Attorney, Agent, or Firm*—Finnegan, Henderson, Farabow, Garrett & Dunner, L.L.P.

(57) ABSTRACT

Texture data filtered according to each of different reduction ratio are stored in a texture buffer. A texture mapping apparatus (an lod calculating apparatus) calculates an lod (Level Of Detail) which represents a reduction ratio of each pixel of a polygon. The calculation does not include a divisional calculation. In other words, the lod calculating apparatus does not need many multipliers, as compared with a case in which an operation including a divisional calculation, thereby enabling the down-sizing of the lod calculating apparatus.

6 Claims, 12 Drawing Sheets

A  $\log_2(w)$

B  $w = 2^e \times m$

C  $\log_2(2^e \times m) = e + \log_2 m$

D  $\log_2 m = m - 1.0 + \text{error}(m)$

E  $\log_2(w) = e + m - 1.0 + \text{error}(m)$ $Log_2 W = e + m - 1.0 + error(m)$

INTEGRAL PART

| $b_0$ | $b_1$ | $b_2$ | $b_3$ |

DECIMAL FRACTION PART

| $b_0$ | $b_1$ | $b_2$ | $b_3$ |

| m−1.0 | error(m) |
|-------|----------|
| 0000  | 0000     |
| 0001  | 0000     |
| 0010  | 0000     |
| 0011  | 0000     |
| 0100  | 0001     |
| 0101  | 0001     |
| 0110  | 0001     |
| 0111  | 0001     |
| 1000  | 0001     |
| 1001  | 0001     |
| 1010  | 0001     |
| 1011  | 0001     |
| 1100  | 0000     |
| 1101  | 0000     |
| 1110  | 0000     |
| 1111  | 0000     |

INTEGRAL    PART AT THE RIGHT
      PART         OF DECIMAL POINT

B    0    | 1 | 0 | 0 | 0 |

PART AT THE RIGHT
                OF DECIMAL POINT

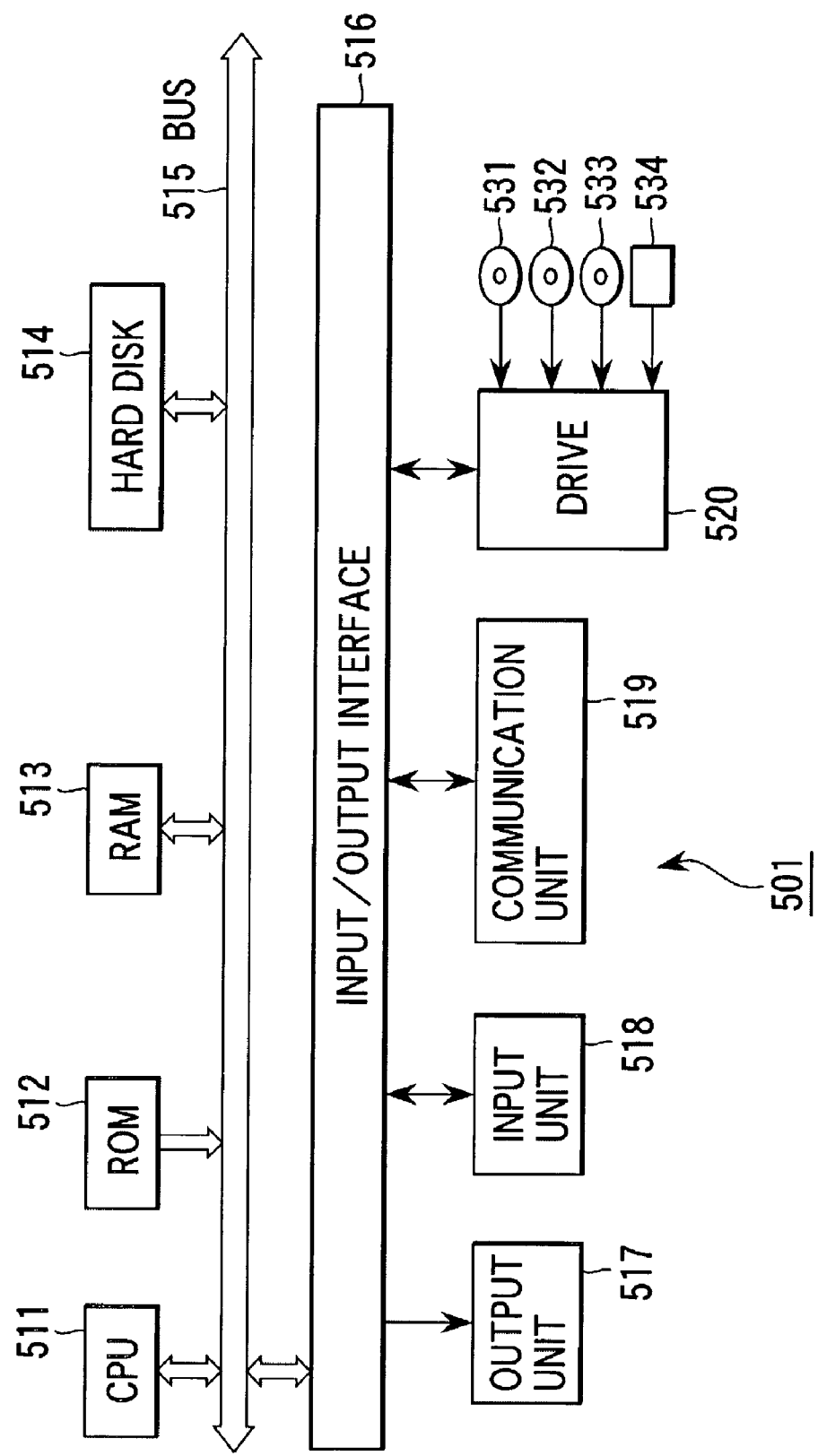

IMAGE PROCESSING APPARATUS AND METHOD, STORAGE MEDIUM, AND PROGRAM

CROSS REFERENCES TO RELATED APPLICATIONS

The present document is based on Japanese Priority Document JP 2001-355866, filed in the Japanese Patent Office on Nov. 21, 2001, the entire contents of which being incorporated herein by reference.

BACKGROUND OF THE INVENTION

1. Field of the Invention

The present invention relates to an image processing apparatus and an image processing method, a storage medium, and a program, in particular to an image processing apparatus and an image processing method, a storage medium, and a program in which an lod (Level Of Detail) is calculated by means of an apparatus with a simple structure.

2. Description of Related Art

In a field of computer graphics, there has been a technique referred to as texture mapping. When rendering a three dimension graphic (model), a prepared two dimension image (hereinafter referred to as texture) is pasted on a surface of the model so as to generate an image with high texture quality.

Referring now to FIG. 1 and FIG. 2, a basic principle of the texture mapping is briefly described below.

XY coordinates of FIG. 1A are coordinates in which the model is mapped. The texture is to be pasted on the model.

A model to be rendered is formed by assembling triangle polygons as shown in FIG. 1A. Vertices A, B, C of each polygon forming the model are provided with coordinate values (Sn, Tn, Qn, where n=1, 2, 3) of three-dimensional coordinates which are hereinafter referred to as texture coordinates (not shown in Figs. below).

Coordinate values (s, t, q) of a point D located in a inner field of the polygon are obtained by linearly interpolating texture coordinate values of points A, B, C. The coordinates (s, t) are homogeneous coordinates (s, t) of texture showing a pasted image pattern. A homogeneous term q is what is called an enlargement/reduction ratio.

Further, texture coordinate values such as the above-mentioned (s, t, q), (Sn, Tn, Qn) are provided for individual polygons which form a model to be rendered, and are variables. Vertex coordinate values (Sn, Tn, Qn, where n=1, 2, 3) of a polygon of the texture coordinates correspond to XY coordinate values (X, Y) and the texture coordinate values (s, t, q) of pixels within the polygon correspond to XY coordinate values (x, y).

UV coordinates of FIG. 1B are two-dimensional coordinates of texture pasted to the polygon of a model to be rendered. UV coordinate values (u, v) become (Sn/Qn, Tn/Qn) obtained by multiplying the homogeneous coordinates (Sn, Tn) of the polygon by a homogeneous term Q. Texture of FIG. 1B is pasted to the polygon in such a way that points A', B', C', D' correspond to the points A, B, C, D of the polygon mapped in the XY coordinates.

FIG. 2B shows how a line element dx (FIG. 2A), in the X-axis direction, of a unit pixel forming the XY coordinates corresponds to a displacement at UV coordinates. The line element dx at the XY coordinates corresponds to a displacement of du/dx in the U-axis direction at the UV coordinates and to a displacement of dv/dx in the V-axis direction. In other words, the du/dx and the dv/dx are respectively a displacement of u and a variation of v at UV coordinates when varying by (dx) at the XY coordinates. A displacement on at the UV coordinates corresponding to a line element dy (not shown) in the Y axis direction is similar to the above.

While, MIPMAP (Multum in parvo mapping) filtering is known as a method for obtaining a high resolution image when mapping texture. The MIPMAP filtering is described in Advanced Animation and Rendering Techniques (page.140) published by ADDISON WESLEY, for example.

As shown in FIG. 3 the MIPMAP filtering prepares a plurality of filtered texture data (original image, 1/2 image, 1/4 image, 1/8 image) respectively corresponding to a plurality of different reduction ratios (1/1, 1/2, 1/4, 1/8, for example, in FIG. 3) and selectively utilizes an optimal texture data corresponding to a reduction ratio of each pixel, thereby controlling an aliasing effect caused by information deletion when compressing an image so as to obtain a high resolution image.

FIG. 4 shows an example utilizing a texture mapping apparatus 1 for MIPMAP filtering.

A texture buffer 3 memorizes texture data carried out with a plurality of filtering processes each corresponding to a plurality of different reduction ratios as shown in FIG. 3

The texture mapping apparatus 1 calculates an lod (Level Of Detail) representing a reduction ratio of each pixel of a polygon. The texture mapping apparatus 1 reads an image, out of the texture buffer 3, corresponding to the calculated lod and outputs the image to a display buffer 4 so as to store it therein. An image based on the stored contents in the display buffer 4 is displayed on a display unit (not shown).

Below, operation of the texture mapping apparatus 1 is described with reference to a flow chart of FIG. 5.

In step S1, the texture mapping apparatus 1 inputs $(s_1, t_1, q_1)$, $(s_2, t_2, q_2)$, and $(s_3, t_3, q_3)$ indicating homogeneous coordinates and a homogeneous term with respect to each vertex of the polygon (FIG. 1A).

Then in step S2, the texture mapping apparatus 1 obtains (s, t, q) indicating homogeneous coordinates and a homogeneous term of each pixel within the polygon by linearly interpolating $(s_1, t_1, q_1)$, $(s_2, t_2, q_2)$, and $(s_3, t_3, q_3)$ of each inputted vertex.

In step S3, the texture mapping apparatus 1 calculates an lod of each pixel based on (s, t, q) of the each pixel within the polygon by means of a built-in lod calculating apparatus 2.

Here, as shown by equation (1), an lod may be represented by a logarithm, having a base of 2, of n if a reduction ratio of each pixel (s, t, q) is 1/n. Thus, lod's become 0, 1, 2, 3, . . . if reduction ratios are 1/1, 1/2, 1/4, 1/8, . . . respectively.

$$Lod = \log_2(n) \qquad (1)$$

The n of the reduction ratio (1/n) can be obtained by equation (2).

$$n = \text{MAX}\left(\left|\frac{du}{dx}\right|, \left|\frac{dv}{dx}\right|, \left|\frac{du}{dy}\right|, \left|\frac{dv}{dy}\right|\right) \qquad (2)$$

The du/dx and the dv/dx in equation (2) are respectively a displacement of u and a variation of v at the UV coordinates when varying by (dx) at the XY coordinates (as shown in FIG. 2B); the du/dy and the dv/dy are respectively a displacement of u and a variation of v at the UV coordinates when varying by (dy) at the XY coordinates; and these are calculated according to equation (3). Thus, n is obtained based on equation (4).

$$\frac{du}{dx} = USIZE \times \frac{dS}{dx} \times \frac{1}{Q} - USIZE \times \frac{dQ}{dx} \times \frac{1}{Q} \times \frac{S}{Q}$$
$$\frac{dv}{dx} = VSIZE \times \frac{dT}{Qx} \times \frac{1}{Q} - VSIZE \times \frac{dQ}{dx} \times \frac{1}{Q} \times \frac{T}{Q}$$
$$\frac{du}{dy} = USIZE \times \frac{dS}{dy} \times \frac{1}{Q} - USIZE \times \frac{dQ}{dy} \times \frac{1}{Q} \times \frac{S}{Q}$$
$$\frac{dv}{dy} = VSIZE \times \frac{dT}{dy} \times \frac{1}{Q} - VSIZE \times \frac{dQ}{dy} \times \frac{1}{Q} \times \frac{T}{Q}$$
(3)

$$n = \text{MAX}\left(\left|\frac{USIZE \times \left(\frac{dS}{dx} \times Q - \frac{dQ}{dx} \times S\right)}{Q^2}\right|,\right.$$
$$\left|\frac{VSIZE \times \left(\frac{dT}{dx} \times Q - \frac{dQ}{dx} \times T\right)}{Q^2}\right|,$$
$$\left|\frac{USIZE \times \left(\frac{dS}{dy} \times Q - \frac{dQ}{dy} \times S\right)}{Q^2}\right|,$$
$$\left.\left|\frac{VSIZE \times \left(\frac{dT}{dy} \times Q - \frac{dQ}{dy} \times T\right)}{Q^2}\right|\right)$$
(4)

In equations (3) and (4), dS/dx, dT/dx, and dQ/dx represent differences of (S, T, Q) per pixel in an X direction, and dS/dy, dT/dy, and dQ/dy represent differences of (S, T, Q) per pixel in a Y direction. USIZE represents a width (length in a U direction) of the texture and VSIZE represents a height (length in a V direction) of the texture.

Thus, the lod is calculated upon operation of equation (5) where equation (1) is substituted with equation (4).

$$Lod = \log_2\left(\text{MAX}\left(\underbrace{\left|\frac{USIZE \times \left(\frac{dS}{dx} \times Q - \frac{dQ}{dx} \times S\right)}{Q^2}\right|}_{A},\right.\right.$$
$$\underbrace{\left|\frac{VSIZE \times \left(\frac{dT}{dx} \times Q - \frac{dQ}{dx} \times T\right)}{Q^2}\right|}_{B},$$
$$\left.\left.\underbrace{\left|\frac{USIZE \times \left(\frac{dS}{dy} \times Q - \frac{dQ}{dy} \times S\right)}{Q^2}\right|}_{C}, \underbrace{\left|\frac{VSIZE \times \left(\frac{dT}{dy} \times Q - \frac{dQ}{dy} \times T\right)}{Q^2}\right|}_{D}\right)\right)$$
(5)

FIG. 6 illustrates an example of the lod calculating apparatus 2 where an operation of equation (5) is carried out so as to calculate an lod.

A divider 11 divides 1 by inputted Q (operation of 1/Q) so as to output a resulting division to a multiplier 12, a multiplier 13, a circuit 21 (multipliers 32, 34), a circuit 22 (multipliers 42, 44), a circuit 24 (multipliers 52, 54), and a circuit 25 (multipliers 62, 64).

The multiplier 12 multiplies S by 1/Q so as to output a resulting product the circuit 21 (multiplier 35) and the circuit 22 (multiplier 45). The multiplier 13 multiplies T by 1/Q so as to output a resulting product the circuit 24 (multiplier 55) and the circuit 25 (multiplier 65).

The circuit 21 formed of a multiplier 31 through an absolute value detector 37 performs an operation of a portion corresponding to reference A (herein after referred to as portion A, similarly referred to for other portions) of equation (5), and the circuit 22 formed of a multiplier 41 through an absolute value detector 47 performs an operation of a portion C of equation (5), thus each outputting its operational result to a maximum value detector 23. The maximum value detector 23 detects the greater of a value from the circuit 21 (value of the portion A) and a value from the circuit 22 (value of the portion C) so as to output its operational result to a maximum value detector 27.

The circuit 24 formed of a multiplier 51 through an absolute value detector 57 performs an operation of a portion B of equation (5), and the circuit 25 formed of a multiplier 61 through an absolute value detector 67 performs an operation of a portion D of equation (5), thus each outputting its operational result to a maximum value detector 26. The maximum value detector 26 detects the greater of a value from the circuit 24 (value of the portion B) and a value from the circuit 25 (value of the portion D) so as to output its operational result to a maximum value detector 27.

The maximum value detector 27 detects the greater of a value from the maximum value detector 23 and a value from the maximum value detector 26 so as to outputting its result to a logarithmic operation unit 28. The logarithmic operation unit 28 performs an operation of a logarithm, having a base of 2, of the value from the maximum value detector 27 so as to output its operational result (operational result of the whole equation (5)) as an lod to the display buffer 4 (FIG. 4).

Then, in step S4, the texture mapping apparatus 1 calculates u data by dividing s data by q data and v data by dividing t data by q data for (s, t, q) of each pixel in order to obtain texture coordinate data (u, v).

In step S5, the texture mapping apparatus 1 obtains a texture address (U, V) based on the lod calculated by the lod calculating apparatus 2 and the texture coordinate data (u, v) which is a physical address of the texture buffer 3 so as to output the texture address to the texture buffer 3 and read texture data (R, G, B).

Then, in step S6, the texture mapping apparatus 1 writes, to the display buffer 4, pixel data obtained by treating the read texture data in step S5 with a predetermined process.

Subsequently, the operation is ended.

As described above, an access to the texture data corresponding to the lod out of a plurality of texture data stored in the texture buffer 3 each corresponding to the plurality of different reduction ratios is performed.

SUMMARY OF THE INVENTION

However, a division of $Q^2$ is carried out for the portions A to D of equation (5). As a result, the lod calculating apparatus 2 as shown in FIG. 6 requires in its structure many multipliers (22 multipliers are needed for the example of FIG. 6) as well as dividers (one divider 11 for the example of FIG. 6). Accordingly, there is a problem such that the lod calculating apparatus 2 becomes too large in scale.

In view of the situation described above, the present invention has been conceived to enable calculation of the lod with an apparatus of simpler structure.

An image processing apparatus according to the present invention includes: storing means for storing a plurality of texture data corresponding to predetermined reduction ratios; determining means for determining a reduction ratio for each pixel of a unit graphic based on operational result of a predetermined equation which does not include a divisional calculation; obtaining means for obtaining texture data, from the storing means, corresponding to the reduction ratio determined by the determining means; and associating means for associating the texture data obtained by the obtaining means with the unit graphic.

The determining means may perform an operation of a logarithm of an arbitrary value W, the logarithm being included in the equation and having a base of 2, by performing an operation of a logarithm of $2^e \times m$ which is a numeric value with floating decimal point of the value W.

The determining means may calculate the logarithm of $2^e \times m$ having a base of 2 according to e, (m−1), and a difference value between $\log_2 m$ and m−1, wherein 1<m<2.

The determining means stores a table of m and a difference value corresponding to m so as to calculate the logarithm of $2^e \times m$ having the base of 2 according to e, (m−1), and the difference value corresponding to m of the table.

An image processing method according to the present invention includes: a storing step for storing a plurality of texture data corresponding to predetermined reduction ratios; a determining step for determining a reduction ratio for each pixel of a unit graphic based on an operational result of a predetermined equation which does not include a division; obtaining step for obtaining texture data, corresponding to the reduction ratio determined in the determining step, from the plurality of texture data stored in the storing step; and a corresponding step for associating the texture data obtained in the obtaining step with the unit graphic.

A program stored in a storage medium according to the present invention includes: a storing control step for storing a plurality of texture data corresponding to predetermined reduction ratios; a determining control step for determining a reduction ratio for each pixel of the unit graphic based on an operational result of a predetermined equation which does not include a divisional calculation; an obtaining control step for obtaining the texture data, which corresponds to the reduction ratio determined in the determining control step, from the plurality of texture data stored in the storing control step; and an associating control step for associating the texture data obtained in the obtaining control step with the unit graphic.

The program according to the present invention enables a computer to execute processing including: a storing control step for storing a plurality of texture data corresponding to predetermined reduction ratios; a determining control step for determining a reduction ratio for each pixel of a unit graphic based on an operational result of a predetermined equation which does not include a divisional calculation; an obtaining control step for obtaining the texture data, which corresponds to the reduction ratio determined in the determining control step, from the plurality of texture data stored in the storing control step; and an associating control step for associating the texture data obtained in the obtaining control step with the unit graphic.

In the image processing apparatus and method, and the program of the present invention, a plurality of texture data corresponding to predetermined reduction ratios are stored, a reduction ratio of each pixel of a unit graphic is determined based on an operational result of a predetermined equation which does not include a divisional calculation, texture data corresponding to the determined reduction ratio is obtained form a plurality of stored texture data, and the obtained texture data is associated with the unit graphic.

According to the image processing apparatus and method, and the program of the present invention, a structure of the image processing apparatus may be simplified.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 14 is a schematic representation for explaining a decimal fraction part; and FIG. 15 is a block diagram showing an example of a personal computer 501.

DESCRIPTION OF THE PREFERRED EMBODIMENT

Figure 7:
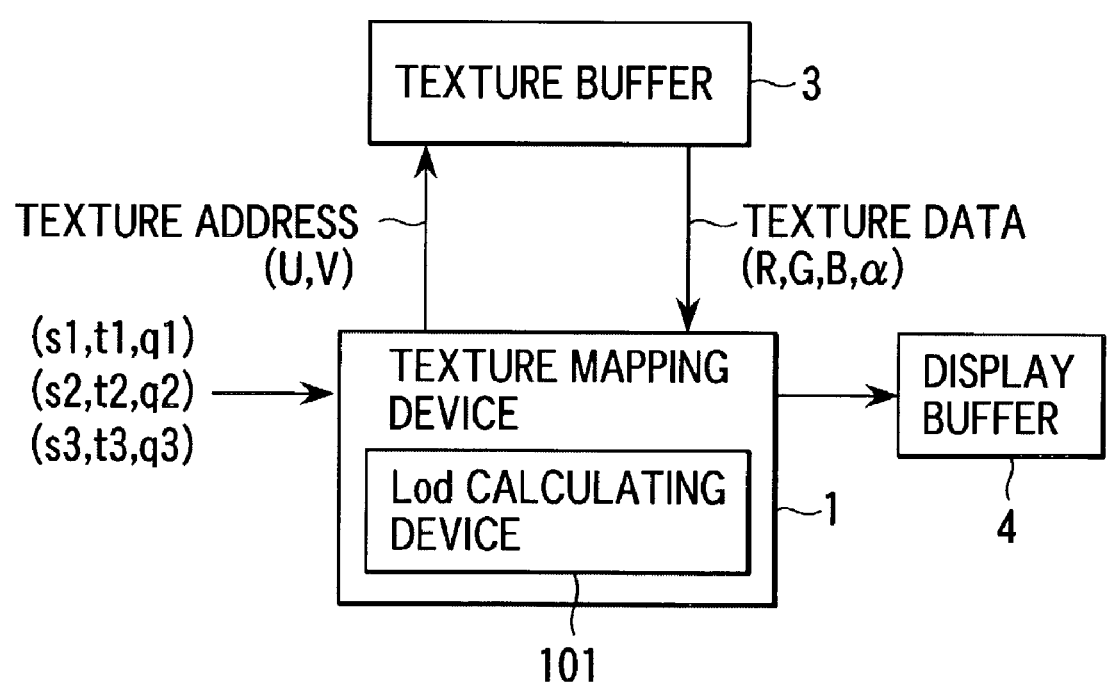
FIG. 7 is a block diagram showing an example of a texture mapping apparatus to which the present invention is applied.

FIG. 7 shows an example of a texture mapping apparatus 1 to which the present invention is applied. The texture mapping apparatus 1 is provided with an lod calculating apparatus 101 in place of the lod calculating apparatus 2 of FIG. 4.

Figure 8:
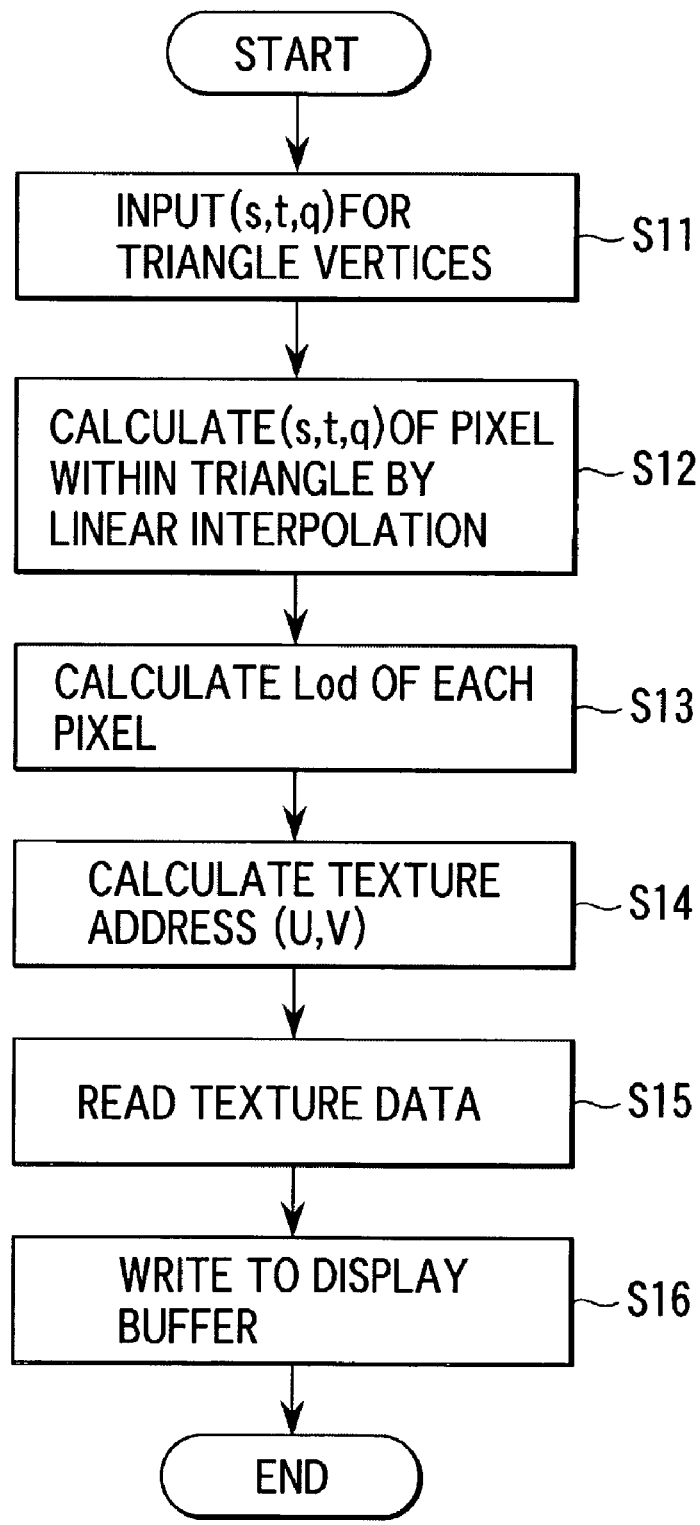
FIG. 8 is a flow chart for explaining an operation of the texture mapping apparatus of FIG. 7.

Below, an operation of the texture mapping apparatus 1 is described with reference to a flow chart of FIG. 8.

Figure 5:
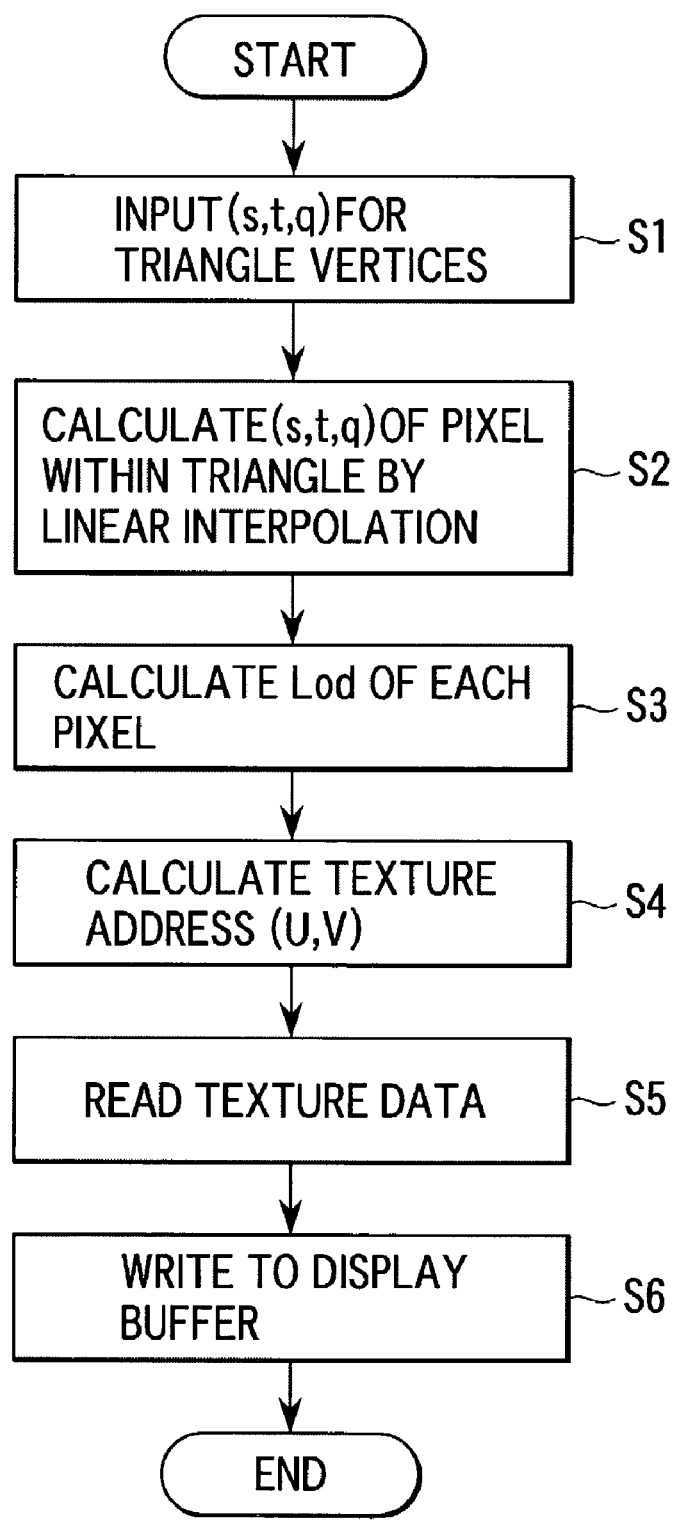
FIG. 5 is a flow chart for explaining an operation of the texture mapping apparatus of FIG. 4.
Figure 6:
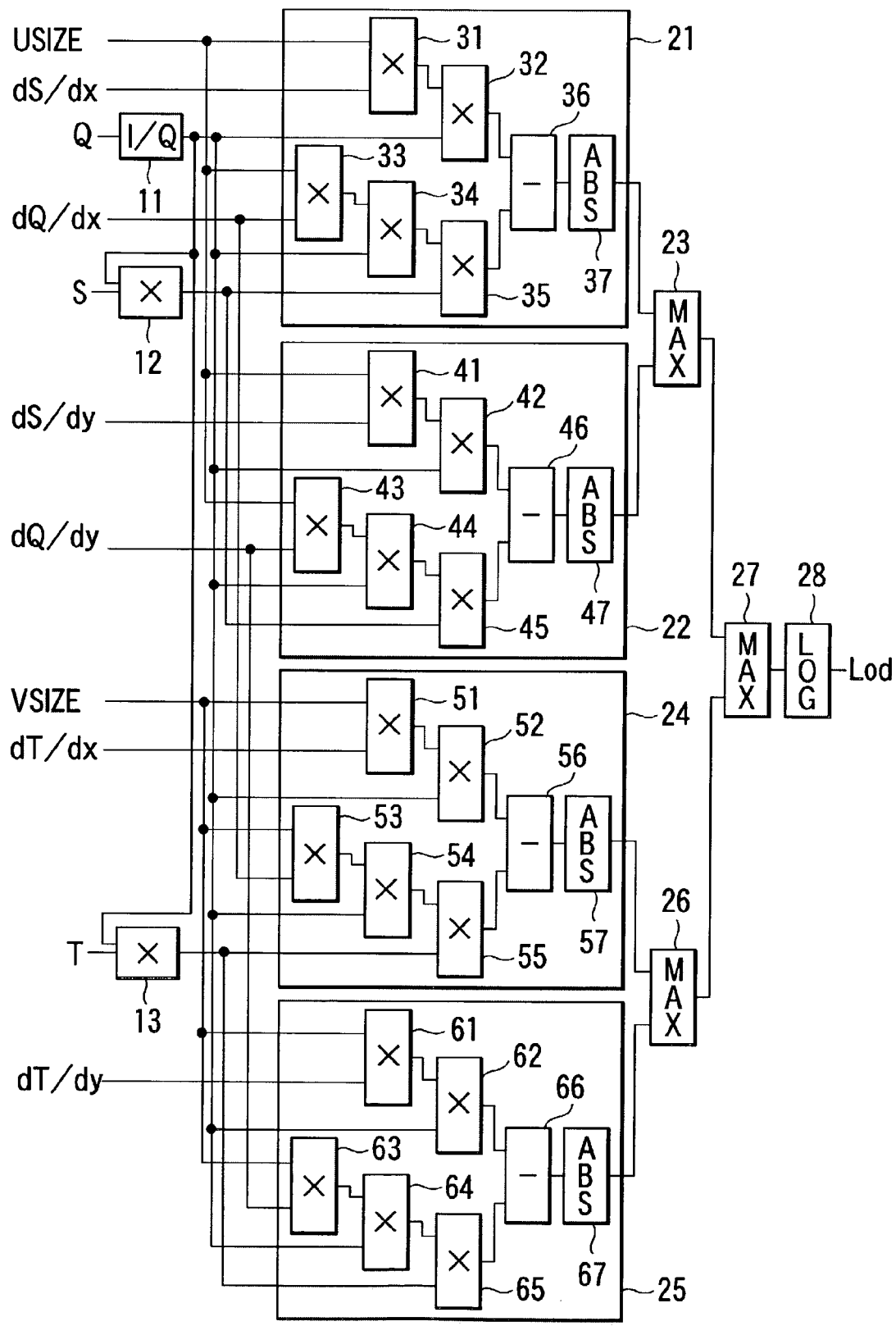
FIG. 6 is a block diagram of an lod calculating apparatus 2 of FIG. 4.

In steps S11, S12, and step S14 to step S16, processes similar to steps S1, S2 and step S4 to step S6 of FIG. 5 are carried out, and description thereof is omitted to avoid redundancy.

In step S13, the lod calculating apparatus 101 performs an operation of equation (6) according to (s, t, q) of each pixel within the polygon so as to obtain an lod.

$$Lod = \text{MAX}((\log_2 USIZE - \log_2 Q^2) + \frac{\log_2 Q^2}{F} \frac{1}{G}) \quad (6)$$

-continued $$\log_2\left(\mathrm{MAX}\left(\underbrace{\left|\frac{dS}{dx}\times Q-\frac{dQ}{dx}\times S\right|}_{A}\underbrace{\left|\frac{dS}{dy}\times Q-\frac{dQ}{dy}\times S\right|}_{B}\right)\right)\cdot$$

$$\underbrace{(\log_2 VSIZE}_{H} - \underbrace{\log_2 Q^2)}_{G} +$$

$$\log_2\left(\mathrm{MAX}\left(\underbrace{\left|\frac{dT}{dx}\times Q-\frac{dQ}{dx}\times T\right|}_{I}\underbrace{\left|\frac{dT}{dy}\times Q-\frac{dQ}{dy}\times T\right|}_{J}\right)\right)$$

Figure 1:
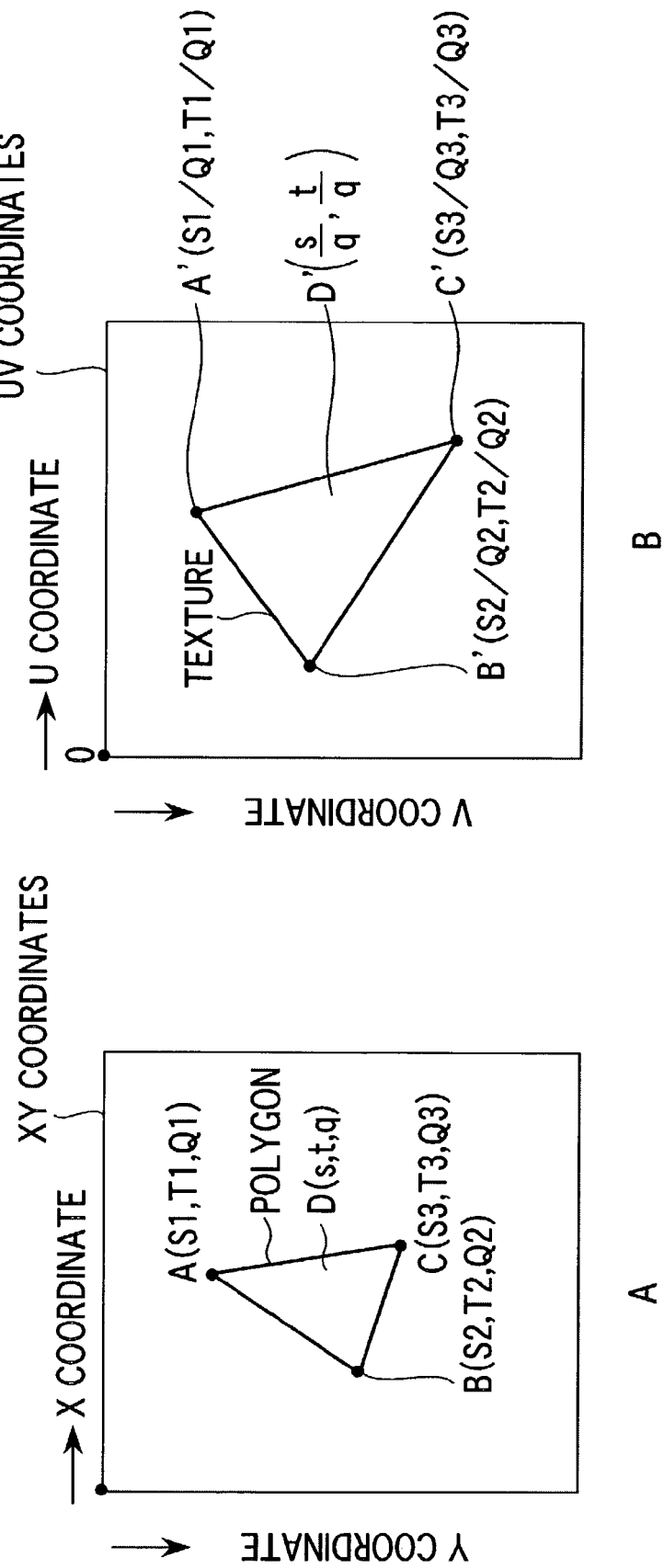
FIG. 1 is a schematic illustration for explaining a basic principle of the texture mapping.
Figure 2:
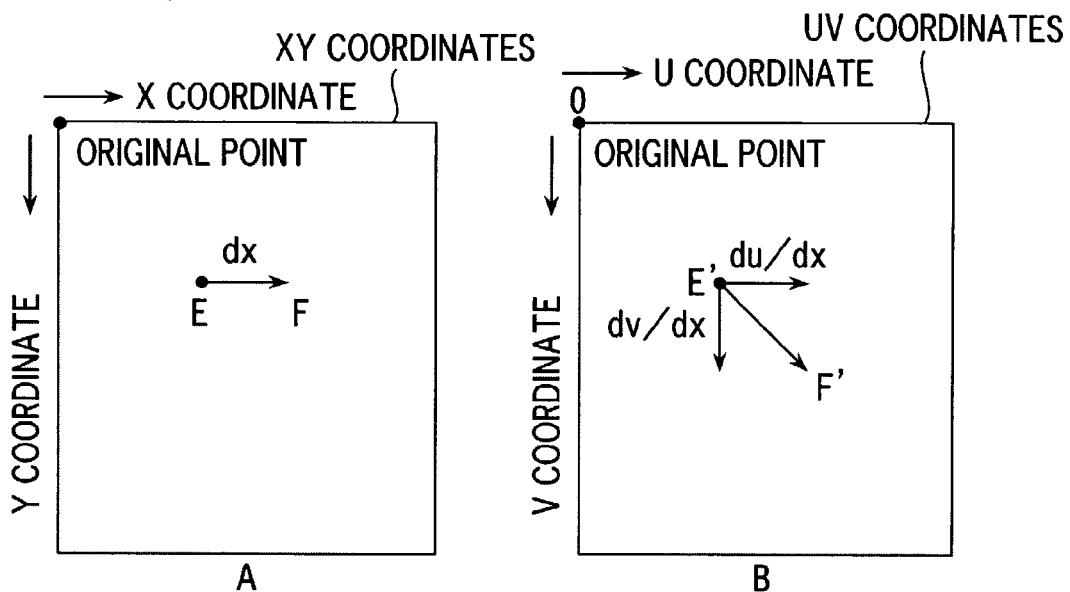
FIG. 2 is another schematic illustration for explaining a basic principle of the texture mapping.
Figure 3:
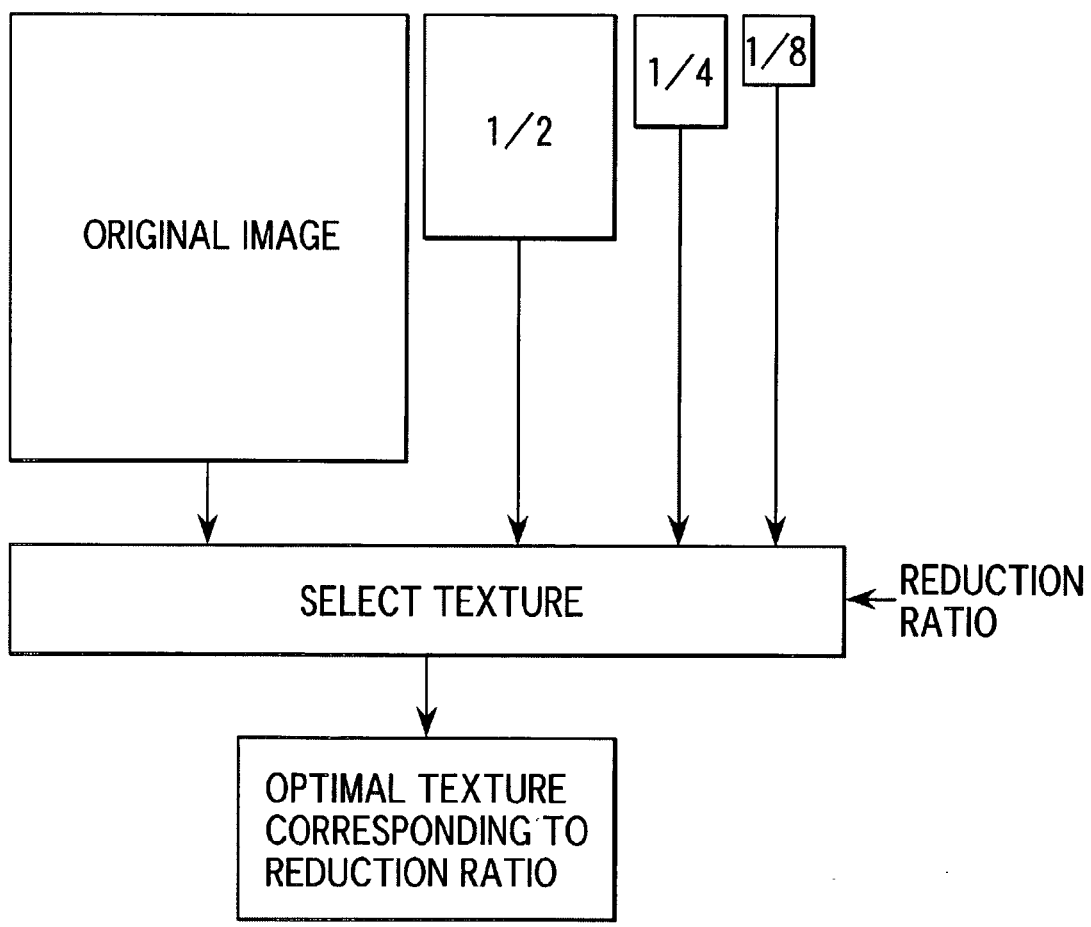
FIG. 3 is a schematic illustration for explaining a basic principle of MIPMAP filtering.
Figure 4:
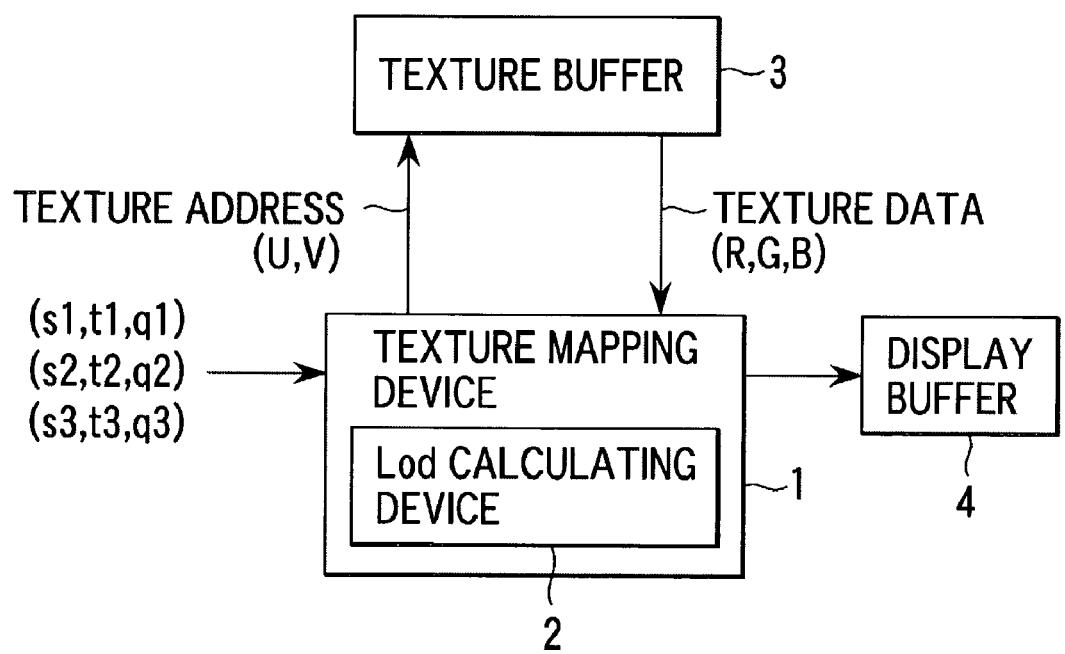
FIG. 4 is a block diagram showing an example of a conventional texture mapping apparatus.

Equation (6) is obtained in such a way that equation (5), which has been performed its operation so as to calculate the lod in the lod calculating apparatus 2 of FIG. 4, is expanded or modified so as not to include a division. More specifically, equation (5) is expanded to obtain equation (7), and further expanded or modified to obtain equation (6).

$$Lod = \log_2\left(\mathrm{MAX}\left(USIZE \times \frac{1}{|Q|^2} \times \mathrm{MAX}\left(\left|\frac{dS}{dx}\times Q-\frac{dQ}{dx}\times S\right|\right.\right.\right. \tag{7}$$

$$\left.\left|\frac{dS}{dy}\times Q-\frac{dQ}{dy}\times S\right|\right)\cdot VSIZE\times \frac{1}{|Q|^2}\times$$

$$\left.\left.\mathrm{MAX}\left(\left|\frac{dT}{dx}\times Q-\frac{dQ}{dx}\times T\right|\,\left|\frac{dT}{dy}\times Q-\frac{dQ}{dy}\times S\right|\right)\right)\right)$$

Figure 9:
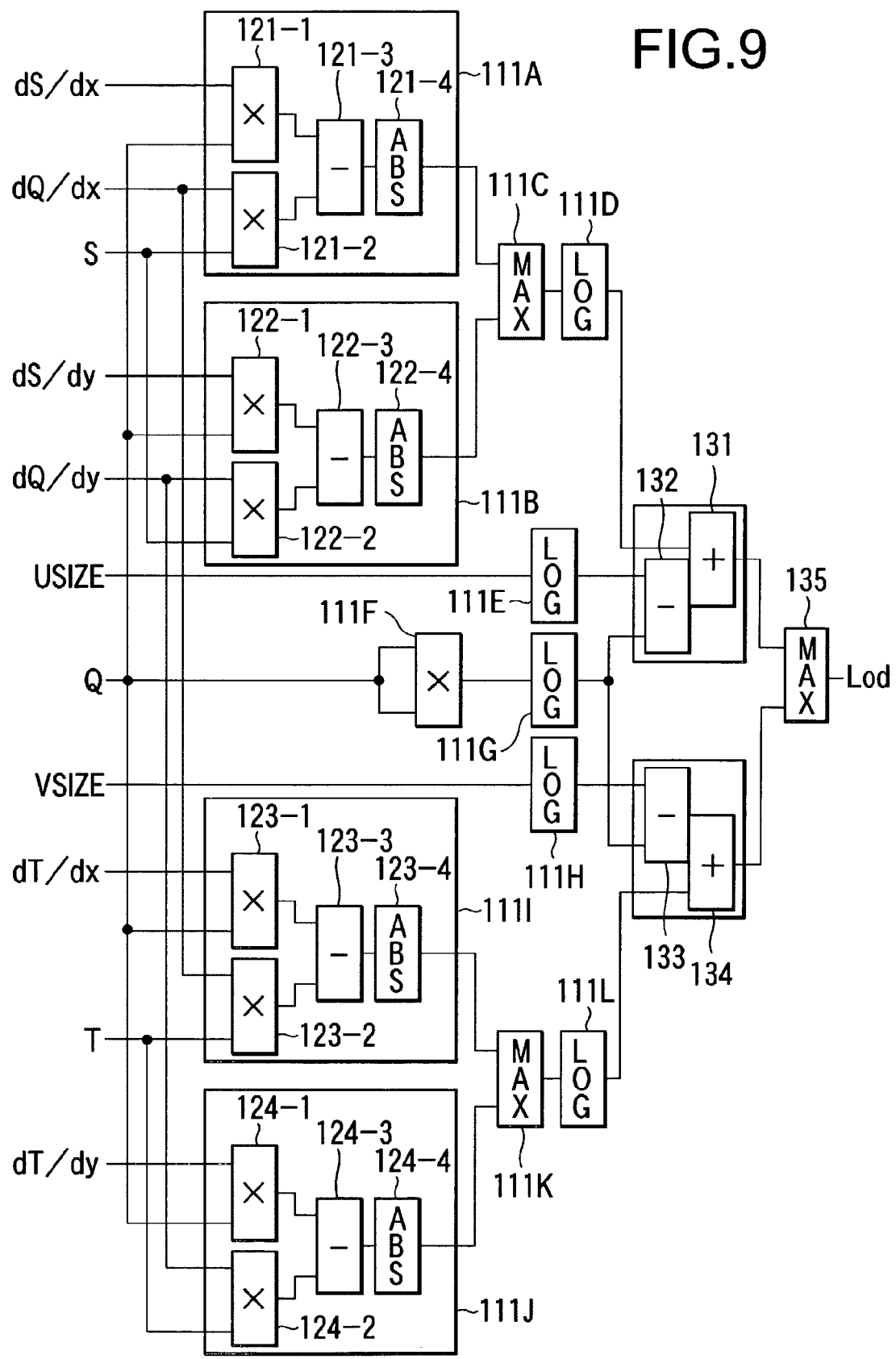
FIG. 9 is a block diagram showing an example of an lod calculating apparatus of FIG. 7.

FIG. 9 shows an example of the lod calculating apparatus 101. Although the lod calculating apparatus 2 of FIG. 4 is provided with 22 multipliers, the lod calculating apparatus 101 includes only 9 multipliers, thereby the apparatus is down-scaled.

Each of circuits 111A, 111B, 111I, and 111J of FIG. 9 includes two multipliers, a subtracter, and an absolute value detector.

The circuit 111A including a multiplier 121-1 to an absolute value detector 121-4 performs an operation of a portion A of equation (6), and outputs its operational result to a maximum value detector 111C. Specifically, the multiplier 121-1 multiplies dS/dx by Q, a multiplier 121-2 multiplies dQ/dx by S, and each multipliers outputs respective resulting product to a subtracter 121-3. The subtracter 121-3 subtracts the resulting product of the multiplier 121-2 from the resulting product of the multiplier 121-1 in order to output its resulting subtraction to the absolute value detector 121-4. The absolute value detector 121-4 detects an absolute value of the resulting subtraction of the subtracter 121-3, and outputs its resulting detection to the maximum value detector 111C.

The circuit 111B including a multiplier 122-1 to an absolute value detector 122-4 performs an operation of a portion B of equation (6), and outputs its operational result to a maximum value detector 111C.

The maximum value detector 111C detects the greater of the operational result (a value of the portion A of equation (6)) from the circuit 111A and the operational result (a value of the portion B of equation (6)) from the circuit 111B in order to output the greater to a logarithmic operation unit 111D. Specifically, the maximum value detector 111C performs the operation of the portion C of equation (6).

The logarithmic operation unit 111D performs an operation of a logarithm, having a base of 2, of the value from the maximum value detector 111C (performs an operation of a portion D of equation (6)), and outputs its operational result to an adder 131.

A logarithmic operation unit 111E performs an operation of a logarithm, having a base of 2, of USIZE (performs an operation of a portion E of equation (6)), and outputs its operational result to a subtracter 132.

A multiplier 111F performs an operation of square of Q (performs an operation of a portion F of equation (6)), and outputs its operational result to a logarithmic operation unit 111G. The logarithmic operation unit 111G performs an operation of a logarithm, having a base of 2, of the square of Q (performs an operation of a portion G), and outputs its operational result to the subtracter 132 and a subtracter 133.

A logarithmic operation unit 111H performs an operation of a logarithm, having a base of 2, of VSIZE (performs an operation of a portion H of equation (6)), and outputs its operational result to the subtracter 133.

A circuit 111I including a multiplier 123-1 to an absolute value detector 123-4 performs an operation of a portion I of equation (6), and a circuit 111J including a multiplier 124-1 to an absolute value detector 124-4 performs an operation of a portion J of equation (6). The circuits output respective operational results to a maximum value detector 111K.

The maximum value detector 111K detects the greater of the operational result (a value of the portion I of equation (6)) from the circuit 111I and the operational result (a value of the portion J of equation (6)) from the circuit 111J (performs an operation of a portion K), and outputs the greater to a logarithmic operation unit 111L. The logarithmic operation unit 111L performs an operation of a logarithm, having a base of 2, of the value from the maximum value detector 111K (performs an operation of a portion L), and outputs its operational result to an adder 134.

The subtracter 132 subtracts the result of the logarithmic operation unit 111G from the result of the logarithmic operation unit 111E, and outputs its resulting subtraction to the adder 131. The adder 131 adds the result of the logarithmic operation unit 111D to the result of the subtracter 132, and outputs its resulting addition to a maximum value detector 135.

The subtracter 133 subtracts the result of the logarithmic operation unit 111G from the result of the logarithmic operation unit 111H, and outputs its resulting subtraction to the adder 134.

The adder 134 adds the result of the logarithmic operation unit 111L to the result of the subtracter 133, and outputs its resulting addition to the maximum value detector 135.

The maximum value detector 135 detects the greater of the operational result from the adder 131 and the result from the adder 134, and outputs its resulting detection (operational result of the whole equation (6)) as an lod to the display buffer 4.

While, the logarithmic operation units 111D, E, G, H, L perform operations of logarithm, having a base of 2, of inputted value (hereinafter referred to as value W) as shown in the equation of FIG. 10A. Since the value inputted to the lod calculating apparatus 101 is a numeric value with floating point, an operation of a logarithm of the numeric value with floating point is carried out.

Below, the operation of the logarithm of the numeric value with floating point is described.

The value W in numeric value with floating point is represented as shown in FIG. 10B. If a logarithm of the value is taken, having a base of 2, as shown in the left side of FIG. 10C, the right side of FIG. 10C may be obtained.

Figures 10, 11:
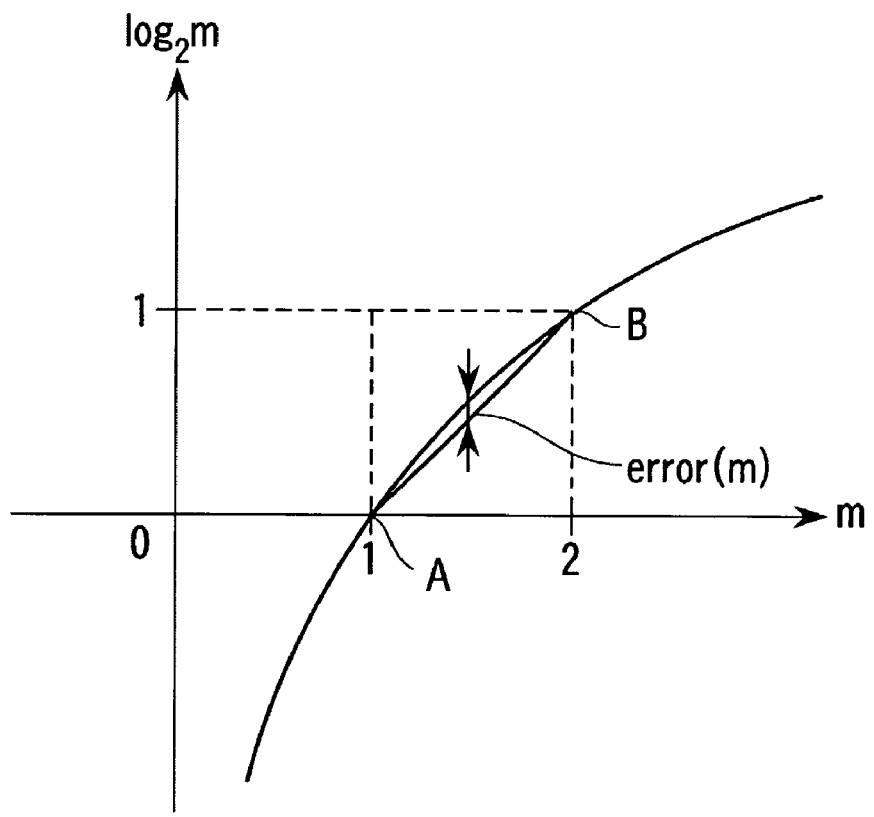
FIG. 10 is a schematic representation for explaining a method of calculating an lod in the lod calculating apparatus of FIG. 7.
FIG. 11 is a graph showing the relationship between $\log_2 m$ and m.

While, a trace of the second term ($\log_2 m$) on the right side of FIG. 10C may be as shown in FIG. 11. In other words, if 1<m<2, the second term on the right side of FIG. 10C may be approximated to a straight line passing through a point A and a point B in FIG. 11 so that the equation of FIG. 10D is valid.

A term "error(m)" in the equation of FIG. 10D is a difference between the second term on the right side of FIG. 10C and the straight line passing the points A and B of FIG. 11 (difference between $\log_2 m$ and (m−1.0)).

Specifically, if 1<m<2, a logarithmic operation unit obtains e and m which form a numeric value of floating point of the value W and error(m) corresponding to m. By substituting the equation of FIG. 10D for the right side of FIG. 10C (eventually performs an operation of the right side of FIG. 10E), a value of the logarithm of FIG. 10A may be obtained.

Here, error(m) (as in equations of FIGS. 10D, 10E, FIG. 11) provides one-to-one correspondence to m. In this example, it is assumed that the logarithmic operation unit stores a correspondence table (which will be described later and is in particular a correspondence table where m−1 and error(m) are in one-to-one correspondence), and that the error(m) corresponding to m of the value W is obtained from the correspondence table.

Figures 12, 13:
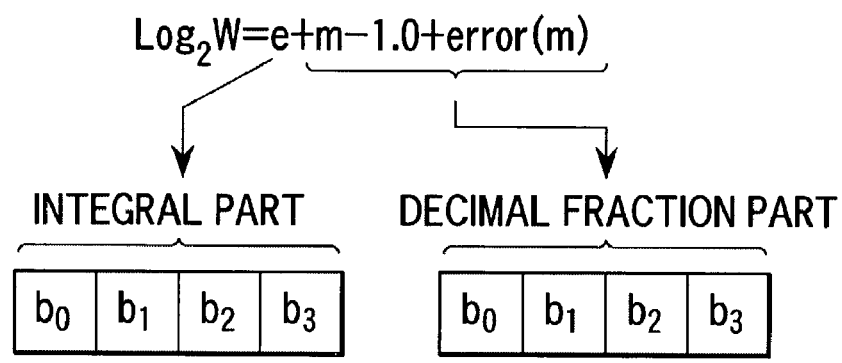
FIG. 12 is a schematic representation for explaining a data structure of the lod.
FIG. 13 is a schematic representation for explaining a correspondence table.

Further, in this example, an addition of e, (m−1.0) to error(m) (which is an operation of the right side of FIG. 10E) is carried out in such a way that e is represented by 4 bits and set at an integral part, and (m−1.0+error(m)) is represented by 4 bits and set at a decimal fraction part as shown in FIG. 12 because e is an integer and (m−1.0)+error(m) becomes a value after the decimal point if 1<m<2. In other words, the lod consists of an integral part of 4 bits and a decimal fraction part of 4 bits.

Still further, an addition of (m−1.0) to error(m) is carried out by adding the 4 bits representing m−1.0 to the 4 bits representing error(m). Specifically, in this example, the 4 bits representing (m−1.0) as a numeric value after the decimal point and the 4 bits corresponding thereto and representing error(m) as a numeric value after the decimal point are set in the correspondence table as shown in FIG. 13. The closer to 0 or 1 the value of m−1.0 is or the closer to 1 or 2 the value of m is, the smaller error(m) is as shown in FIG. 11.

For example, if m−1.0 has a value of 0.5 (or if m=1.5), the 4 bits representing m−1.0 is "1000". Accordingly, the value "1000" is added to "0001" of the term error(m) which is set according to "1000" of the term m−1.0 in the correspondence table, thereby "1001" of its resulting addition becomes a decimal fraction part.

Further, when a value of 1 is represented by 1 bit for an integer and 4 bits for a numeric value after the decimal point as shown in FIG. 14A, the value of 0.5 is represented in such a way that the value of 1 set at the 1 bit for representing the integer as in FIG. 14A is shifted to the right in FIGS. by 1 bit (or the value of 1 is reduced to half) so that the value of 0.5 is becomes a "1000" as shown in FIG. 14B.

A series of processes as described above may be provided by means of hardware and software as well. In order to provide the series of processes by means of software, one or more programs which compose the software are installed in a computer and executed in the computer, thereby functionalities of the lod calculating apparatus 101 described above are realized.

FIG. 15 is a block diagram showing an embodiment of a computer 501 which functions as the lod calculating apparatus 101 as described above. A CPU (Central Processing Unit) 511 is connected to an input/output interface 516 via a bus 515. When a user inputs a command from an input unit 518 such as a keyboard, a mouse via the input/output interface 516, the CPU 511 loads a program on a RAM (Random Access Memory) 513 so as to execute. The program may be stored in a storage medium such as ROM (Read Only Memory) 512, a hard disk 514, and a magnetic disk 531, a optical disk 532, a magneto-optical disk 533 and a semiconductor memory 534 which may be mounted in a drive 520, thereby each process as described above is carried out.

Further, if necessary, the CPU 511 outputs its result to an output unit 517 such as an LCD (Liquid Crystal Display) through the input/output interface 516, for example. The program may be stored in the hard disk 514 or the ROM 512 beforehand so as to be provided together with the computer 501, or may be provided as a package medium such as the magnetic disk 531, the optical disk 532, the magneto-optical disk 533 and the semiconductor memory 534 or may be provided to the hard disk 514 through a communication unit 519 by means of a satellite, a network or the like.

In this specification, the steps describing the program provided by means of a storage medium may be processes wherein the steps are carried out in a time-serial order as described above, or may be processes where the steps are performed in parallel or individually instead of the time serial order.

Further, in this specification, a "system" is intended to refer to a whole group of apparatuses including a plurality of apparatuses.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. An image processing apparatus for determining a reduction ratio for each pixel of a plurality of unit graphics which form a model, and associating texture data, which corresponds to said reduction ratio determined, with said unit graphic, said apparatus comprising:

storing means for storing a plurality of texture data corresponding to predetermined reduction ratios;

determining means for determining a reduction ratio for each pixel of said unit graphic based on an operational result of a predetermined equation which does not include a divisional calculation and does not include an inversion;

obtaining means for obtaining texture data from said storing means, the obtained texture data corresponding to said reduction ratio determined by said determining means; and associating means for associating said texture data obtained by said obtaining means with said unit graphic.

2. The image processing apparatus according to claim 1, wherein said determining means performs an operation of a logarithm of an arbitrary value W, the logarithm being included in said equation and having a base of 2, by performing an operation of a logarithm of $2^e \times m$ which is a numeric value with floating decimal point of said value W.

3. An image processing apparatus for determining a reduction ratio for each pixel of a plurality of unit graphics which form a model, and associating texture data, which corresponds to said reduction ratio determined, with said unit graphic, said apparatus comprising:

storing means for storing a plurality of texture data corresponding to predetermined reduction ratios;

determining means for determining a reduction ratio for each pixel of said unit graphic based on an operational result of a predetermined equation which does not include a divisional calculation;

obtaining means for obtaining texture data from said storing means, the obtained texture data corresponding to said reduction ratio determined by said determining means; and associating means for associating said texture data obtained by said obtaining means with said unit graphic, wherein said determining means performs an operation of a logarithm of an arbitrary value W, the logarithm being included in said equation, by performing an operation of a logarithm of $2^e \times m$ which is a numeric value with floating decimal point of said value W, and said determining means calculates said logarithm of $2^e \times m$ having a base of 2 according to e, (m−1), and a difference value between $\log_2 m$ and m−1, wherein 1<m<2.

4. An image processing apparatus for determining a reduction ratio for each pixel of a plurality of unit graphics which form a model, and associating texture data, which corresponds to said reduction ratio determined, with said unit graphic, said apparatus comprising:

storing means for storing a plurality of texture data corresponding to predetermined reduction ratios;

determining means for determining a reduction ratio for each pixel of said unit graphic based on an operational result of a predetermined equation which does not include a divisional calculation;

obtaining means for obtaining texture data from said storing means, the obtained texture data corresponding to said reduction ratio determined by said determining means; and associating means for associating said texture data obtained by said obtaining means with said unit graphic, wherein said determining means performs an operation of a logarithm of an arbitrary value W, the logarithm being included in said eguation and having a base of 2, by performing an operation of a logarithm of $2^e \times m$ in which is a numeric value with floating decimal point of said value W, and said determining means stores a table of m and a difference value corresponding to m so as to calculate said logarithm of $2^e \times m$ having the base of 2 according to e, (m−1), and said difference value corresponding to said m of said table.

5. An image processing method of determining a reduction ratio for each pixel of a plurality of unit graphics which forms a model, and associating texture data, which corresponds to said reduction ratio determined, with said unit graphic, the method comprising:

a storing step for storing a plurality of texture data corresponding to predetermined reduction ratios;

a determining step for determining a reduction ratio for each pixel of said unit graphic based on an operational result of a predetermined equation which, does not include a divisional calculation and does not include an inversion;

an obtaining step for obtaining texture data from said plurality of texture data stored in processing of said storing step, the obtained texture data corresponding to said reduction ratio determined by said determining step; and an associating step for associating said texture data obtained by said obtaining step with said unit graphic.

6. A storage medium which stores a computer-readable program containing instructions to cause an information processing device to perform a method for determining a reduction ratio for each pixel of a plurality of unit graphics which form a model, and associating texture data, which corresponds to said reduction ratio determined, with said unit graphic, said method comprising:

a storing control step for storing a plurality of texture data corresponding to predetermined reduction ratios;

a determining control step for determining a reduction ratio for each pixel of said unit graphic based on an operational result of a predetermined equation which does not include a divisional calculation and does not include an inversion;

an obtaining control step for obtaining the texture data, which corresponds to said reduction ratio determined in said determining control step, from said plurality of texture data stored in said storing control step; and an associating control step for associating said texture data obtained in said obtaining control step with said unit graphic.

* * * * *